(12) United States Patent
Sharf et al.

(10) Patent No.: US 10,923,856 B2
(45) Date of Patent: Feb. 16, 2021

(54) POLARIZATION FEATURE FOR A RECEPTACLE CAGE

(71) Applicant: TE CONNECTIVITY CORPORATION, Berwyn, PA (US)

(72) Inventors: Alex Michael Sharf, Harrisburg, PA (US); Richard James Long, Columbia, PA (US); Steven David Dunwoody, Middletown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 16/401,263

(22) Filed: May 2, 2019

(65) Prior Publication Data
US 2019/0363494 A1 Nov. 28, 2019

Related U.S. Application Data

(60) Provisional application No. 62/676,338, filed on May 25, 2018.

(51) Int. Cl.
*H01R 13/64* (2006.01)
*H01R 13/645* (2006.01)
(Continued)

(52) U.S. Cl.
CPC ....... *H01R 13/645* (2013.01); *H01R 13/6582* (2013.01); *H01R 4/64* (2013.01); *H01R 12/716* (2013.01); *H01R 13/506* (2013.01); *H01R 13/516* (2013.01); *H01R 13/5202* (2013.01); *H01R 13/5213* (2013.01); *H01R 13/629* (2013.01); *H01R 13/64* (2013.01); *H01R 13/648* (2013.01); *H01R 13/6456* (2013.01); *H01R 13/6581* (2013.01); *H01R 13/6594*
(2013.01); *H01R 13/74* (2013.01); *H01R 13/741* (2013.01); *H01R 13/745* (2013.01); *H01R 24/50* (2013.01); *H01R 43/26* (2013.01)

(58) Field of Classification Search
CPC .... H01R 13/745; H01R 13/741; H01R 43/26; H01R 13/5202; H01R 13/74; H01R 13/64; H01R 13/6456; H01R 13/506; H01R 12/716; H01R 13/629; H01R 13/6594; H01R 13/6581; H01R 4/64; H01R 13/516; H01R 13/5213; H01R 13/648; H01R 24/50; H01R 13/645; H01R 13/6582
USPC ........................ 439/680, 677, 557, 550, 553
See application file for complete search history.

(56) References Cited

U.S. PATENT DOCUMENTS 7,419,399 B2 * 9/2008 Yosler .................... H01R 13/74
439/358
10,236,605 B1 * 3/2019 Henry .................. H01R 12/732
(Continued)

FOREIGN PATENT DOCUMENTS

WO 2019104059 A1 5/2019

*Primary Examiner* — Abdullah A Riyami
*Assistant Examiner* — Justin M Kratt

(57) ABSTRACT

A receptacle connector assembly includes a receptacle cage having first and second side walls extending from a top wall to form a module channel configured to receive a pluggable module. The top wall is non-planar and has a shroud extending therefrom forming a cage polarization feature. The shroud has a first shroud side wall, a second shroud side wall and a shroud top wall forming a polarization feature channel configured to receive a polarization feature of the pluggable module.

20 Claims, 4 Drawing Sheets

(51) Int. Cl.
*H01R 13/6582* (2011.01)
*H01R 24/50* (2011.01)
*H01R 13/52* (2006.01)
*H01R 43/26* (2006.01)
*H01R 12/71* (2011.01)
*H01R 13/74* (2006.01)
*H01R 13/648* (2006.01)
*H01R 13/6581* (2011.01)
*H01R 13/6594* (2011.01)
*H01R 13/506* (2006.01)
*H01R 13/629* (2006.01)
*H01R 4/64* (2006.01)
*H01R 13/516* (2006.01)

(56) References Cited

U.S. PATENT DOCUMENTS

| | | | |
|---|---|---|---|
| 10,243,305 B1* | 3/2019 | Pan | H01R 13/506 |
| 2009/0264002 A1* | 10/2009 | Bright | H01R 13/741 |
| | | | 439/271 |
| 2016/0309625 A1* | 10/2016 | Brodsky | H01R 13/6592 |

* cited by examiner

POLARIZATION FEATURE FOR A RECEPTACLE CAGE

CROSS REFERENCE TO RELATED APPLICATIONS

This application claims benefit to U.S. Provisional Application No. 62/676,338 filed May 25, 2018, titled "POLARIZATION FEATURE FOR A RECEPTACLE CAGE", the subject matter of which is herein incorporated by reference in its entirety.

BACKGROUND OF THE INVENTION

The subject matter herein relates generally to polarization features for receptacle cages.

Some communication systems utilize communication connectors to interconnect various components of the system for data communication. Some known communication systems use pluggable modules, such as I/O modules, that are electrically connected to the communication connector. Known communication systems provide electrical shielding, such as in the form of a receptacle cage surrounding the communication connector and the pluggable module to provide electrical shielding. However, there is a desire to increase throughput in communication systems. For example, high speed pluggable modules and corresponding receptacle cages have been proposed having similar geometries as conventional pluggable modules and receptacle cages. However, the pluggable modules are not backwards compatible with older receptacle cages and the pluggable modules have a polarization feature included along the top of the pluggable module in the form of a post or tab extending form the top that restricts the possibility of loading the new high speed pluggable module into one of the older receptacle cages. The new high speed receptacle cages have corresponding polarization features in the form of a channel that receives the tab of the new high speed pluggable modules. The new high speed receptacle cages are backwards compatible with older pluggable modules and will accept older pluggable modules.

A need remains for a reliable way of forming the polarization feature on the receptacle cage and providing EMI shielding at the polarization feature on the receptacle cage.

BRIEF DESCRIPTION OF THE INVENTION

In one embodiment, a receptacle connector assembly is provided including a receptacle cage configured to be mounted to a host circuit board. The receptacle cage has a top wall, a first side wall extending from the top wall and a second side wall extending from the top wall opposite the first side wall. The top wall, the first side wall and the second side wall form a module channel configured to receive a pluggable module. The top wall is non-planar and has a shroud extending therefrom forming a cage polarization feature. The shroud has a first shroud side wall, a second shroud side wall and a shroud top wall forming a polarization feature channel configured to receive a polarization feature of the pluggable module. The receptacle connector assembly has a communication connector positioned relative to the module channel for interfacing with the pluggable module configured to be electrically connected to the host circuit board.

Optionally, the shroud may be trapezoidal shaped forming a trapezoidal shaped polarization feature channel. The first shroud side wall may be angled non-perpendicular to the shroud top wall and the second shroud side wall may be angled non-perpendicular to the shroud top wall. The first shroud side wall may be nonparallel to the second shroud side wall.

Optionally, the receptacle cage may extends between a front end and a rear end and the top wall may have a front edge at the front end that is continuous between the first side wall and the second side wall and that extends along the shroud over the polarization feature channel.

Optionally, the receptacle connector assembly may include a gasket coupled to the top wall having a plurality of spring fingers deflectable relative to the top wall. The gasket may be coupled to the shroud. The gasket may include a base having a complementary shape as the top wall. The base may extend along the first shroud side wall and/or the second shroud side wall and/or the shroud top wall. The base may extend between the shroud and the first side wall and/or between the shroud and the second side wall. Optionally, the gasket may have at least one spring finger extending along the first shroud side wall and/or at least one spring finger extending along the second shroud side wall and/or at least one spring finger extending along the shroud top wall. Optionally, the spring finger along the first shroud side wall may be deflectable in a first deflection direction nonorthogonal to a second deflection direction of the nearest spring finger along the top wall.

Optionally, the top wall may include a panel and the shroud may extend upward from the panel. The panel of the top wall may include a first segment between the first shroud side wall and the first side and a second segment between the second shroud side wall and the second side. The first and second segments may be coplanar. Optionally, the top wall may include a first corner connecting the first segment and the first shroud side wall and a second corner connecting the second segment and the second shroud side wall. The top wall may be continuous through the first corner and through the second corner. Optionally, a gasket may be coupled to the top wall having a plurality of spring fingers deflectable relative to the top wall. The gasket may have at least one spring finger extending along the first segment. The gasket may have at least one spring finger extending along the first shroud side wall and/or at least one spring finger extending along the second shroud side wall and/or at least one spring finger extending along the second segment.

Optionally, the first shroud side wall, the second shroud side wall and/or the shroud top wall may be curved. Optionally, the shroud may be triangular shaped having the first shroud side wall meeting the second shroud side wall at the shroud top wall with the shroud top wall being a point.

In another embodiment, a receptacle connector assembly is provided including a receptacle cage configured to be mounted to a host circuit board having a top wall, a first side wall extending from the top wall and a second side wall extending from the top wall opposite the first side wall. The top wall, the first side wall and the second side wall form a module channel configured to receive a pluggable module. The top wall has a shroud extending therefrom forming a cage polarization feature. The shroud is trapezoidal shaped forming a trapezoidal shaped polarization feature channel configured to receive a polarization feature of the pluggable module. A communication connector is positioned relative to the module channel for interfacing with the pluggable module. The communication connector is configured to be electrically connected to the host circuit board.

In a further embodiment, a receptacle connector assembly is provided including a receptacle cage configured to be mounted to a host circuit board extending between a front end and a rear end. The receptacle cage has a top wall, a first side wall extending from the top wall and a second side wall extending from the top wall opposite the first side wall. The top wall, the first side wall and the second side wall form a module channel having a port at the front end configured to receive a pluggable module. The top wall has a front edge at the front end of the receptacle cage being continuous between the first side and the second side. The front edge is non-planar forming a cage polarization feature having a polarization feature channel configured to receive a polarization feature of the pluggable module. A communication connector positioned relative to the module channel for interfacing with the pluggable module and is configured to be electrically connected to the host circuit board.

DETAILED DESCRIPTION OF THE INVENTION

Figure 1:
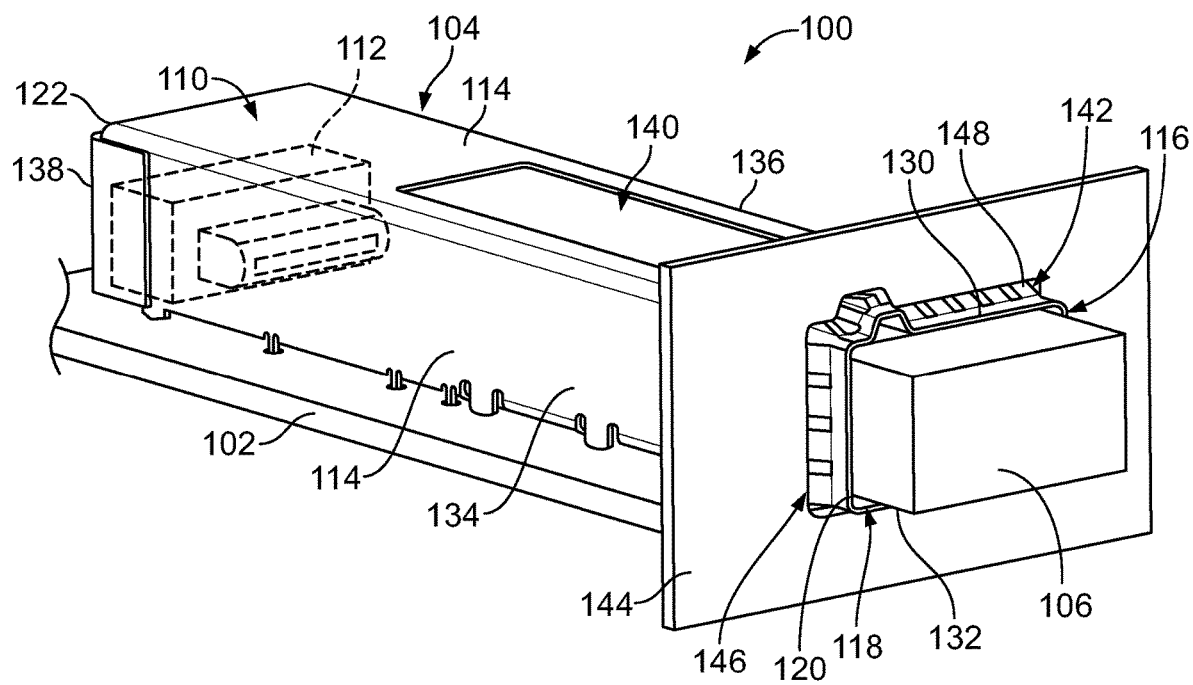
FIG. 1 is a front perspective view of a communication system formed in accordance with an exemplary embodiment.

FIG. 1 is a front perspective view of a communication system 100 formed in accordance with an exemplary embodiment. The communication system includes a host circuit board 102 and a receptacle connector assembly 104 mounted to the host circuit board 102. A pluggable module 106 (fully shown in FIG. 2) is configured to be electrically connected to the receptacle connector assembly 104. The pluggable module 106 is electrically connected to the host circuit board 102 through the receptacle connector assembly 104.

In an exemplary embodiment, the receptacle connector assembly 104 includes a receptacle cage 110 and a communication connector 112 (shown with phantom lines) adjacent the receptacle cage 110. For example, in the illustrated embodiment, the communication connector 112 is received in the receptacle cage 110. In other various embodiments, the communication connector 112 may be located rearward of the receptacle cage 110. In various embodiments, the receptacle cage 110 is enclosed and provides electrical shielding for the communication connector 112. The pluggable modules 106 are loaded into the receptacle cage 110 and are at least partially surrounded by the receptacle cage 110. In an exemplary embodiment, the receptacle cage 110 is a shielding, stamped and formed cage member that includes a plurality of shielding walls 114 that define one or more module channels for receipt of corresponding pluggable modules 106. In other embodiments, the receptacle cage 110 may be open between frame members to provide cooling airflow for the pluggable modules 106 with the frame members of the receptacle cage 110 defining guide tracks for guiding loading of the pluggable modules 106 into the receptacle cage 110.

In the illustrated embodiment, the receptacle cage 110 is a single port receptacle cage configured to receive a single pluggable module 106. In other various embodiments, the receptacle cage 110 may be a ganged cage member having a plurality of ports ganged together in a single row and/or a stacked cage member having multiple ports stacked as an upper port and a lower port. The receptacle cage 110 includes a module channel 116 having a module port 118 open to the module channel 116. The module channel 116 receives the pluggable module 106 through the module port 118. In an exemplary embodiment, the receptacle cage 110 extends between a front end 120 and a rear end 122. The module port 118 is provided at the front end 120. Any number of module channels 116 may be provided in various embodiments arranged in a single column or in multiple columns (for example, 2×2, 3×2, 4×2, 4×3, 4×1, 2×1, and the like). Optionally, multiple communication connectors 112 may be arranged within the receptacle cage 110, such as when multiple rows and/or columns of module channels 116 are provided.

In an exemplary embodiment, the walls 114 of the receptacle cage 110 include a top wall 130, a bottom wall 132, a first side wall 134 and a second side wall 136 extending from the top wall 130. The bottom wall 132 may rest on the host circuit board 102. In other various embodiments, the receptacle cage 110 may be provided without the bottom wall 132. Optionally, the walls 114 of the receptacle cage 110 may include a rear wall 138 at the rear end 122. The walls 114 define a cavity 140. For example, the cavity 140 may be defined by the top wall 130, the bottom wall 132, the side walls 134, 136 and the rear wall 138. The cavity 140 includes the module channel 116. In various embodiments, the cavity 140 receives the communication connector 112, such as at the rear end 122. Other walls 114 may separate or divide the cavity 140 into additional module channels 116, such as in embodiments using ganged and/or stacked receptacle cages. For example, the walls 114 may include one or more vertical divider walls between ganged module channels 116. In various embodiments, the walls 114 may include a separator panel between stacked upper and lower module channels 116. The separator panel may include an upper panel and a lower panel that form a space between the upper and lower module channels 116, such as for airflow, for a heat sink, for routing light pipes, or for other purposes.

In an exemplary embodiment, the receptacle cage 110 may include one or more gaskets 142 at the front end 120 for providing electrical shielding for the module channels 116. For example, the gaskets 142 may be provided at the port 118 to electrically connect with the pluggable modules 106 received in the module channel 116. Optionally, the pluggable module 106 may include a gasket that engages the receptacle cage 110 rather than the receptacle cage 110 having a gasket that engages the pluggable module 106. In an exemplary embodiment, the gaskets 142 may be provided around the exterior of the receptacle cage 110 for interfacing with a panel 144, such as when the front end 120 of the receptacle cage 110 extends through a cutout 146 in the panel 144. The gaskets 142 may include spring fingers 148 or other deflectable features that are configured to be spring biased against the panel 144 to create an electrical connection with the panel 144.

Optionally, the receptacle connector assembly 104 may include one or more heat sinks (not shown) for dissipating heat from the pluggable modules 106. For example, the heat sink may be coupled to the top wall 130 for engaging the pluggable module 106 received in the module channel 116. The heat sink may extend through an opening in the top wall 130 to directly engage the pluggable module 106. Other types of heat sinks may be provided in alternative embodiments.

In an exemplary embodiment, the communication connector 112 is received in the cavity 140, such as proximate to the rear wall 138. However, in alternative embodiments, the communication connector 112 may be located behind the rear wall 138 exterior of the receptacle cage 110 and extend into the cavity 140 to interface with the pluggable module(s) 106. In an exemplary embodiment, a single communication connector 112 is provided. In alternative embodiments, the communication system 100 may include multiple communication connectors 112 (for example, for stacked and/or ganged receptacle cages) for mating with corresponding pluggable modules 106.

In an exemplary embodiment, the pluggable modules 106 are loaded through the port 118 at the front end 120 to mate with the communication connector 112. The shielding walls 114 of the receptacle cage 110 provide electrical shielding around the communication connector 112 and the pluggable module 106, such as around the mating interface between the communication connector 112 and the pluggable module 106.

Figure 2:
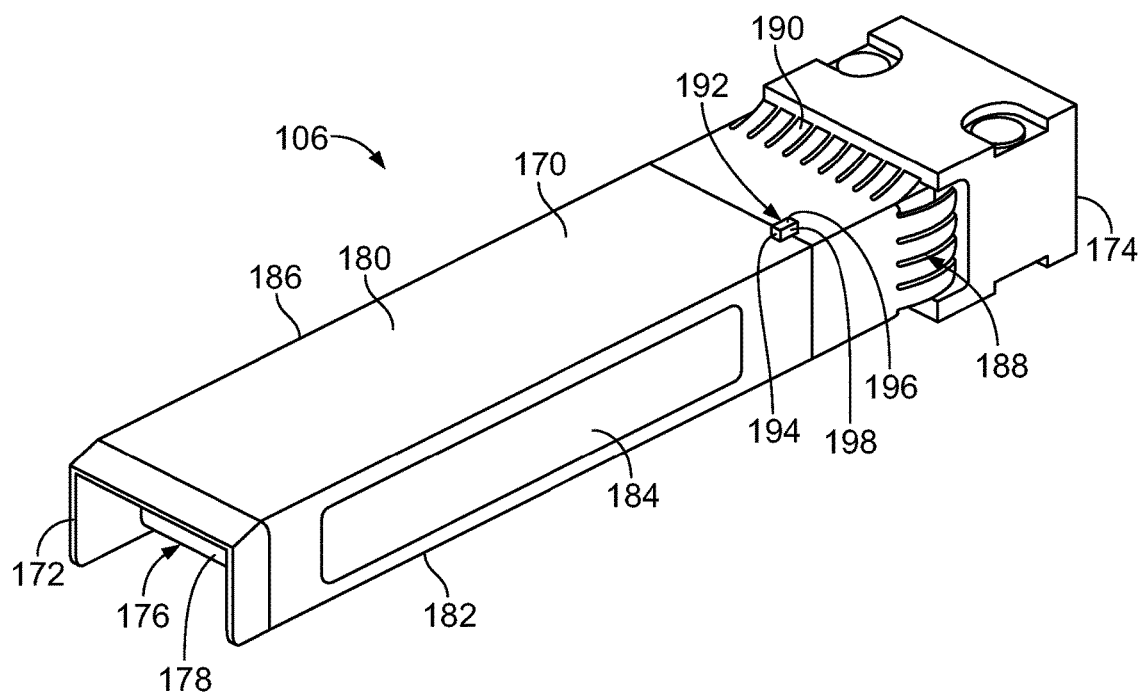
FIG. 2 is a rear perspective view of pluggable module of the communication system in accordance with an exemplary embodiment.

FIG. 2 is a rear perspective view of the pluggable module 106 in accordance with an exemplary embodiment. The pluggable module 106 has a pluggable body 170, which may be defined by one or more shells. The pluggable body may be thermally conductive and/or may be electrically conductive, such as to provide EMI shielding for the pluggable module 106. The pluggable body 170 includes a mating end 172 and an opposite front end 174. The mating end 172 is configured to be inserted into the corresponding module channel 116 (shown in FIG. 1). The front end 174 may be a cable end having a cable extending therefrom to another component within the system.

The pluggable module 106 includes a module circuit board 176 that is configured to be communicatively coupled to the communication connector 112 (shown in FIG. 1). The module circuit board 176 may be accessible at the mating end 172. The module circuit board 176 has a mating edge 178 and mating contacts at the mating edge 178 configured to be mated with the communication connector 112. The module circuit board 176 may include components, circuits and the like used for operating and or using the pluggable module 106. For example, the module circuit board 176 may have conductors, traces, pads, electronics, sensors, controllers, switches, inputs, outputs, and the like associated with the module circuit board 176, which may be mounted to the module circuit board 176, to form various circuits.

The pluggable module 106 includes an outer perimeter defining an exterior of the pluggable body 170. For example, the outer perimeter may be defined by a top 180, a bottom 182, a first side 184 and a second side 186. The pluggable body 170 may have other shapes in alternative embodiments. In an exemplary embodiment, the pluggable module 106 includes a gasket 188 around the outer perimeter, such as proximate to the front end 174. The gasket 188 may be provided on the top 180 and/or the bottom 182 and/or the sides 184, 186. The gasket 188 includes deflectable spring fingers 190 configured to engage the receptacle cage 110. The spring fingers 190 may be electrically connected to the interior of the receptacle cage 110 when the pluggable module 106 is plugged into the module channel 116. The spring fingers 190 may provide electrical shielding (for example, EMI shielding) along the pluggable body 170, such as at the port 118.

In an exemplary embodiment, the pluggable module 106 includes a polarization feature 192 at the outer perimeter. The polarization feature 192 is used to restrict mating of the pluggable module 106 in an incorrect orientation or with an incorrect receptacle cage 110. In the illustrated embodiment, the polarization feature 192 is defined by a protrusion 194 extending from the pluggable body 170. For example, the polarization feature 192 may be a post or tab extending from the top 180. In an exemplary embodiment, the polarization feature 192 includes a top 196 and sides 198. Optionally, the polarization feature 192 may be offset, such as closer to the first side 184. Optionally, multiple polarization features 192 may be provided. In other various embodiments, the polarization feature 192 may be provided at other locations. The polarization feature 192 may be provided at a predetermined depth from the mating end 172 to ensure that the mating end 172 and/or the module circuit board 176 does not mate with the communication connector 112 when plugged into the receptacle cage 110 with the polarization feature 192 and incorrect orientation.

In an exemplary embodiment, the pluggable body 170 provides heat transfer for the module circuit board 176, such as for the electronic components on the module circuit board 176. For example, the module circuit board 176 is in thermal communication with the pluggable body 170 and the pluggable body 170 transfers heat from the module circuit board 176. Optionally, the pluggable body 170 may include a plurality of heat transfer fins (not shown) along at least a portion of the outer perimeter of the pluggable module 106 for dissipating heat from the pluggable body 170.

Figure 3:
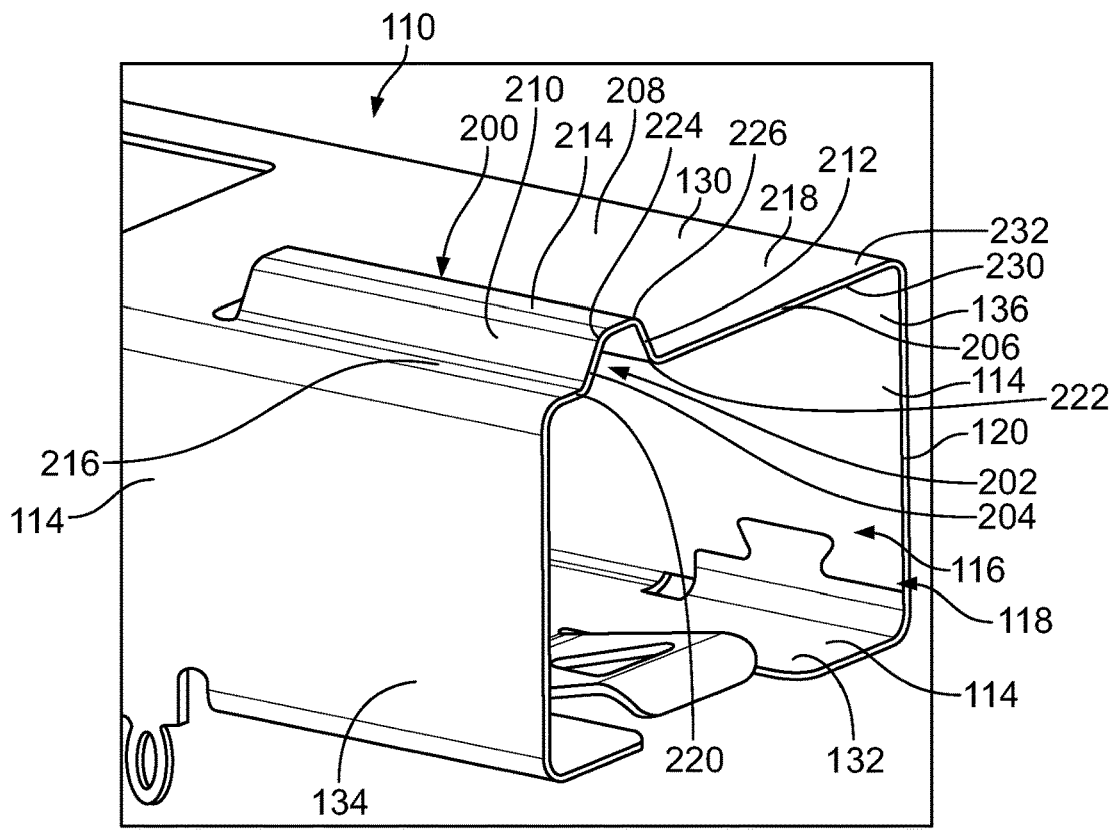
FIG. 3 is a perspective view of a front end of a receptacle cage of the communication system in accordance with an exemplary embodiment.

FIG. 3 is a perspective view of the front end 120 of the receptacle cage 110 in accordance with an exemplary embodiment. FIG. 3 shows the module port 118 to the module channel 116 open at the front end 120 configured to receive the pluggable module 106 therein. In the illustrated embodiment, the module channel 116 is surrounded by the top wall 130, the bottom wall 132, and the side walls 134, 136.

In an exemplary embodiment, the receptacle cage 110 includes a cage polarization feature 200 configured to interface with the polarization feature 192 of the pluggable module 106. In the illustrated embodiment, the cage polarization feature 200 is provided along the top wall 130; however, in alternative embodiments, the cage polarization feature 200 may be provided along one or more additional or alternative walls 114 of the receptacle cage 110. In an exemplary embodiment, the cage polarization feature 200 includes a polarization feature channel 202 open to the module channel 116. The polarization feature channel 202 receives the polarization feature 192 of the pluggable module 106. For example, the polarization feature channel 202 may be sized and shaped to receive the polarization feature 192 and may be positioned along the top wall 130 to receive the polarization feature 192.

In an exemplary embodiment, the top wall 130 is non-planar including a shroud 204 extending therefrom forming the cage polarization feature 200. The shroud 204 is provided at a front edge 206 of the top wall 130 and extends rearward from the front edge 206. In an exemplary embodiment, the shroud 204 is integral with the top wall 130. For example, the shroud 204 is formed with the top wall 130, such as being stamped and formed or extruded with the top wall 130. The shroud 204 is a continuous part of the top wall 130.

The shroud 204 includes a first shroud side wall 210, a second shroud side wall 212 and a shroud top wall 214 extending between the first shroud side wall 210 and the second shroud side wall 212. In various embodiments, the shroud walls 210, 212, 214 are planar walls, however; the shroud walls may be curved in other various embodiments. For example, at least one of the first shroud side wall 210 and/or the second shroud side wall 212 and/or the shroud top wall 214 may be curved. In an exemplary embodiment, the shroud 204 is trapezoidal shaped forming a trapezoidal shaped polarization feature channel 202. For example, the first shroud side wall 210 is angled non-perpendicular to the shroud top wall 214 and the second shroud side wall 212 is angled non-perpendicular to the shroud top wall 214. The first shroud side wall 210 is angled nonparallel to the second shroud wall 212. The shroud 204 may have other shapes in alternative embodiments. The shroud 204 may include greater or fewer walls in alternative embodiments. For example, the shroud top wall 214 may be eliminated and the shroud 204 may be triangular-shaped in alternative embodiments. For example, the shroud 204 may be triangular shaped having the first shroud side wall 210 meeting the second shroud side wall 212 at the shroud top wall 214 with the shroud top wall 216 being a point or having a near zero width.

In an exemplary embodiment, the top wall 130 includes a panel 208 defined by a first segment 216 and a second segment 218 with the shroud 204 being formed out of the panel 208 and extending upward from the panel 208. The first segment 216 extends between the first shroud side wall 210 and the first side wall 134 of the receptacle cage 110. The second segment 218 extends between the second shroud side wall 212 and the second side wall 136 of the receptacle cage 110. In the illustrated embodiment, the first and second segments 216, 218 are coplanar and the shroud 204 extends above the first and second segments 216, 218. Optionally, the first segment 216 may be narrower than the second segment 218 (and the second segment 218 may be wider than the first segment 216) such that the shroud 204 is offset and positioned closer to the first side wall 134 and further from the second side wall 136. In other various embodiments, the first and second segments 216, 218 may have equal widths with the shroud 204 centered between the first and second side walls 134, 136.

The top wall 130 includes a first corner 220 connecting the first segment 216 and the first shroud side wall 210 and a second corner 222 connecting the second segment 218 and the second shroud side wall 212. The top wall 130 is continuous through the first corner 220 and through the second corner 222. For example, the first segment 216 is continuous with the first shroud side wall 210 and the second segment 218 is continuous with the second shroud side wall 212. The top wall 130 includes a third corner 224 connecting the first shroud side wall 210 and the shroud top wall 214 and a fourth corner 226 connecting the second shroud side wall 212 and the shroud top wall 214. The top wall 130 is continuous through the third corner 224 and through the fourth corner 226. For example, the first shroud side wall 210 is continuous with the shroud top wall 214 and the second shroud side wall 212 is continuous with the shroud top wall 214. In an alternative embodiment, the shroud 204 may be provided at the first side wall 134 or the second side wall 136 such that the top wall 130 does not include the first segment 216 and corresponding first corner 220 and/or the second segment 218 and corresponding second corner 222.

In an exemplary embodiment, the front edge 206 of the top wall 130 is continuous between the first side wall 134 and the second side wall 136. For example, the top wall 130 extends along the shroud 204 over the polarization feature channel 202. The front edge 206 is continuous from the first side wall 134 along the first segment 216, through the first corner 220 along the first shroud side wall 210, through the third corner 224 along the shroud top wall 214, through the fourth corner 226 along the second shroud side wall 212, through the second corner 222 along the second segment 218 to the second side wall 136. The top wall 130 is a continuous piece of metal along such segments and walls. There are no gaps or slits in the top wall 130 along the front edge 206. The top wall 130 provides rigid, mechanical stability across the width of the receptacle cage 110 between the first side wall 134 and the second side wall 136. The top wall 130 includes an interior surface 230 facing the module channel 116 and the polarization feature channel 202 and an exterior surface 232 facing the exterior of the receptacle cage 110. In an exemplary embodiment, there are no breaks or gaps along the interior surface 230 or the exterior surface 232 at the front edge 206 even as the top wall 130 forms the cage polarization feature 200.

Figure 4:
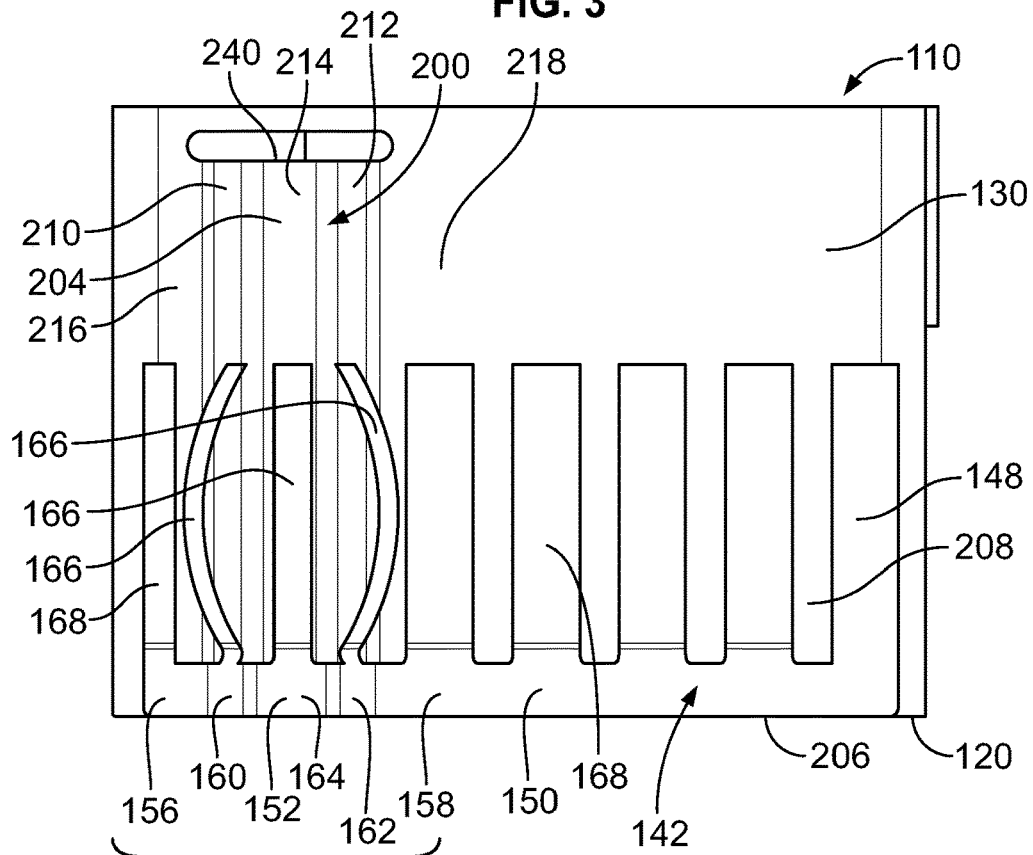
FIG. 4 is a top view of a portion of the receptacle cage at the front end in accordance with an exemplary embodiment.

FIG. 4 is a top view of a portion of the receptacle cage 110 at the front end 120. FIG. 4 shows the gasket 142 coupled to the top wall 130. The gasket 142 includes a base 150 coupled to the top wall 130. The spring fingers 148 extend from the base 150 of the gasket 142. In an exemplary embodiment, the base 150 has a complementary shape as the top wall 130. For example, the base 150 has a complementary shape as, and extends along, the front edge 206 of the top wall 130.

The gasket 142 extends along the cage polarization feature 200. The base 150 has a shroud segment 152 extending along the shroud 204 and a panel segment 154 extending along the panel 208. For example, the panel segment 154 may include a first segment 156 extending along the first segment 216 and a second segment 158 extending along the second segment 218. The shroud segment 152 includes a first shroud side wall segment 160, a second shroud side wall segment 162 and a shroud top wall segment 164. The shroud segment 152 and the panel segment 154 may be continuous along the top wall 130. Optionally, the gasket 142 may be continuous along the top wall 130 and/or the first wall 134 and/or the second wall 136 and/or the bottom wall 132.

The spring fingers 148 of the gasket 142 include shroud spring fingers 166 that extend along the shroud 204 and panel spring fingers 168 that extend along the panel 208. In an exemplary embodiment, the gasket 142 includes at least one shroud spring finger 166 extending along the first shroud side wall 210, at least one shroud spring finger 166 extending along the second shroud side wall 212 and at least one shroud spring finger 166 extending along the shroud top wall 214. In an exemplary embodiment, the gasket 142 includes at least one panel spring finger 168 extending from the first segment 156 and at least one panel spring finger 168 extending from the second segment 158. The spring fingers 148 are configured to engage the panel 144 (shown in FIG. 1).

In an exemplary embodiment, the shroud 204 extends to a rear 240. The top wall 130 may continue rearward of the rear 240 of the shroud 204. In various embodiments, the polarization feature channel 202 may be closed or bridged at the rear 240 to limit or restrict EMI leakage at the rear 240.

Figure 5:
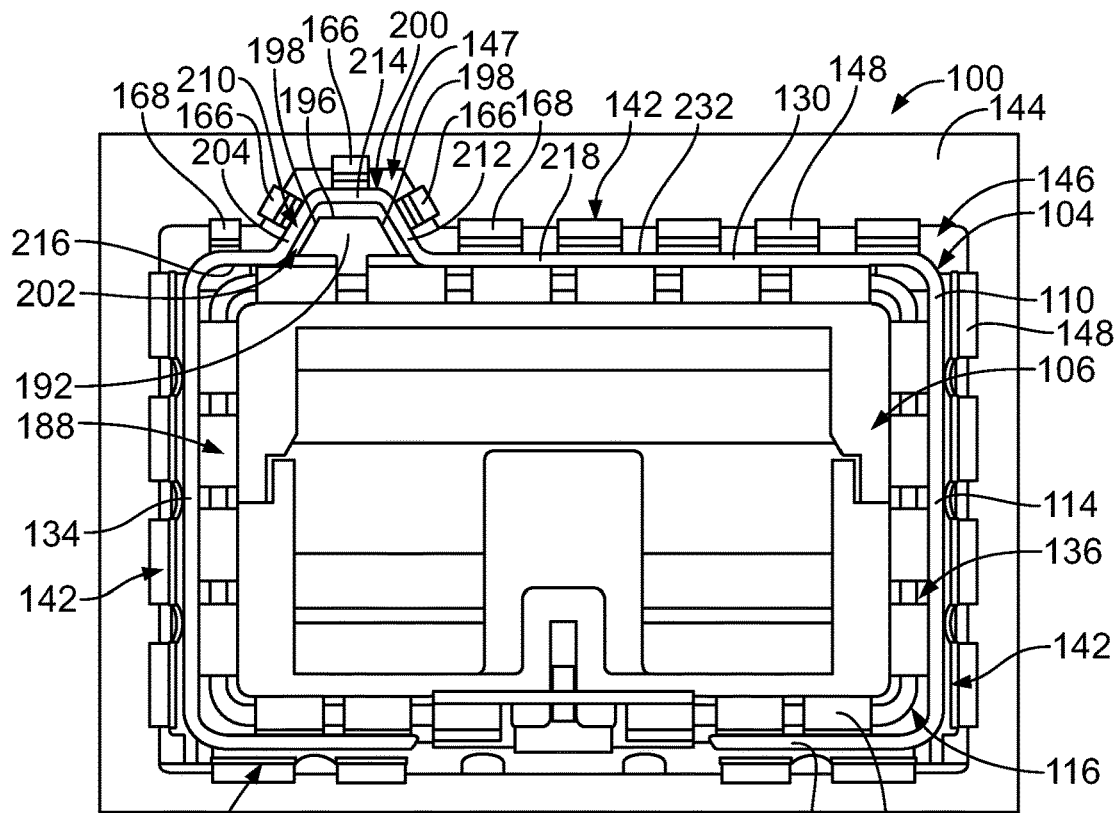
FIG. 5 is a front, partial sectional view of the communication system in accordance with an exemplary embodiment.
Figure 6:
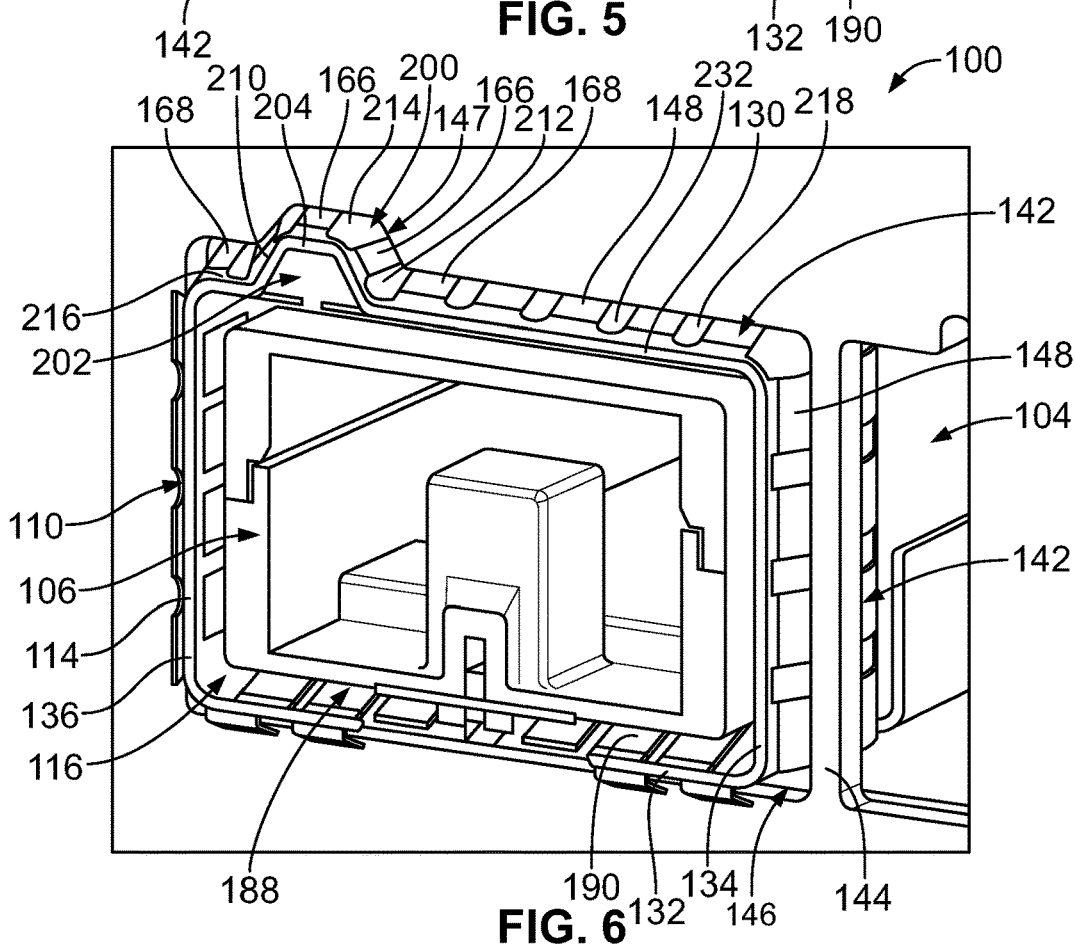
FIG. 6 is a perspective, partial sectional view of the communication system in accordance with an exemplary embodiment.

FIG. 5 is a front, partial sectional view of the communication system 100 in accordance with an exemplary embodiment. FIG. 6 is a perspective, partial sectional view of the communication system 100 in accordance with an exemplary embodiment. FIGS. 5 and 6 illustrate the receptacle connector assembly 104 mounted in the cutout 146 in the panel 144 with the receptacle cage 110 extending through the cutout 146 and the gaskets 142 between the receptacle cage 110 and the panel 144. FIGS. 5 and 6 illustrate the pluggable module 106 in the receptacle cage 110 showing the gaskets 188 of the pluggable module 106 engaging the receptacle cage 110. FIGS. 5 and 6 illustrate the polarization feature 192 of the pluggable module 106 received in the cage polarization feature 200 of the receptacle cage 110.

In an exemplary embodiment, the gaskets 142 are provided circumferentially around the exterior of the receptacle cage 110, such as along the top wall 130, the bottom wall 132, the first side wall 134 and the second side wall 136. The spring fingers 148 of the gaskets 142 are compressed against the panel 144 within the cutout 146. The cutout 146 includes a notch 147 for the cage polarization feature 200. In the illustrated embodiment, the notch 147 has a complementary shape as the cage polarization feature 200. For example, the notch 147 may have a trapezoidal shape having angled side walls and a top wall. The shroud spring fingers 166 engage the edges of the panel 144 defining the notch 147.

In an exemplary embodiment, the first and second shroud side walls 210, 212 are angled relative to the first and second segments 216, 218 to angle the shroud spring fingers 166 upward and outward toward the panel 144. If the shroud side walls 210, 212 were at right angles to the shroud top wall 214, the shroud spring fingers 166 would be biased straight outward therefrom making it difficult to interface with the panel 144. For example, due to the clearance gap defined by the cutout between the exterior surface 232 of the receptacle cage 110 and the edge of the panel 144 defining the cutout 146, there would be very little overlap between the panel 144 and the shroud side walls 210, 212 and thus very little surface area for the shroud spring fingers 166 to engage. The shroud side walls 210, 212 could be made taller and the notch 147 correspondingly made taller to increase the amount of overlap, but that would increase the size of the polarization feature channel 202, which could negatively impact the electrical performance by creating an EMI leakage location.

In an exemplary embodiment, the first and second shroud side walls 210, 212 are angled relative to the first and second segments 216, 218 to angle the shroud spring fingers 166 away from the panel spring fingers 168. For example, if the shroud side walls 210, 212 were at right angles to the shroud top wall 214, the shroud spring fingers 166 would be biased straight outward therefrom directly toward the immediately adjacent panel spring fingers 168. This would cause the shroud spring fingers 166 to interfere with the immediately adjacent panel spring fingers 168 or would require the panel spring fingers 168 to be moved further away decreasing the shielding performance by moving the contact points between the receptacle connector assembly 104 and the panel 144 further apart.

In an exemplary embodiment, the first and second shroud side walls 210, 212 are angled to provide stability for the shroud 204. For example, having the shroud side walls 210, 212 angled provide a more rigid structure than if the shroud side walls 210, 212 are parallel. However, the shroud 204 may have other shapes in alternative embodiments, including shapes having the shroud side walls 210, 212 parallel to each other, with the shroud 204 being integral with the top wall 130.

The pluggable module 106 is received in the module channel 116 and is electrically connected to the communication connector 112 when plugged therein. During mating, the polarization feature 192 is aligned with the cage polarization feature 200. The protrusion 194 is received in the polarization feature channel 202. The top 196 may face the shroud top wall 214 and the sides 198 may face the shroud side walls 210, 212. Optionally, there may be clearance between the protrusion 194 and the shroud 204 such that the shroud 204 does not interfere with loading of the pluggable module 106 into the receptacle cage 110. However, if the pluggable module 106 were improperly oriented relative to the receptacle cage 110, such as if the polarization feature 192 or misaligned with the cage polarization feature 200, the polarization features 192, 200 would restrict mating. In an exemplary embodiment, the receptacle cage 110 provides electrical shielding for the pluggable module 106. In an exemplary embodiment, the gasket 188 of the pluggable module 106 provides EMI shielding at the front end 120 of the receptacle cage 110. For example, the spring fingers 190 may engage the interior surfaces of the walls 114.

Figure 7:
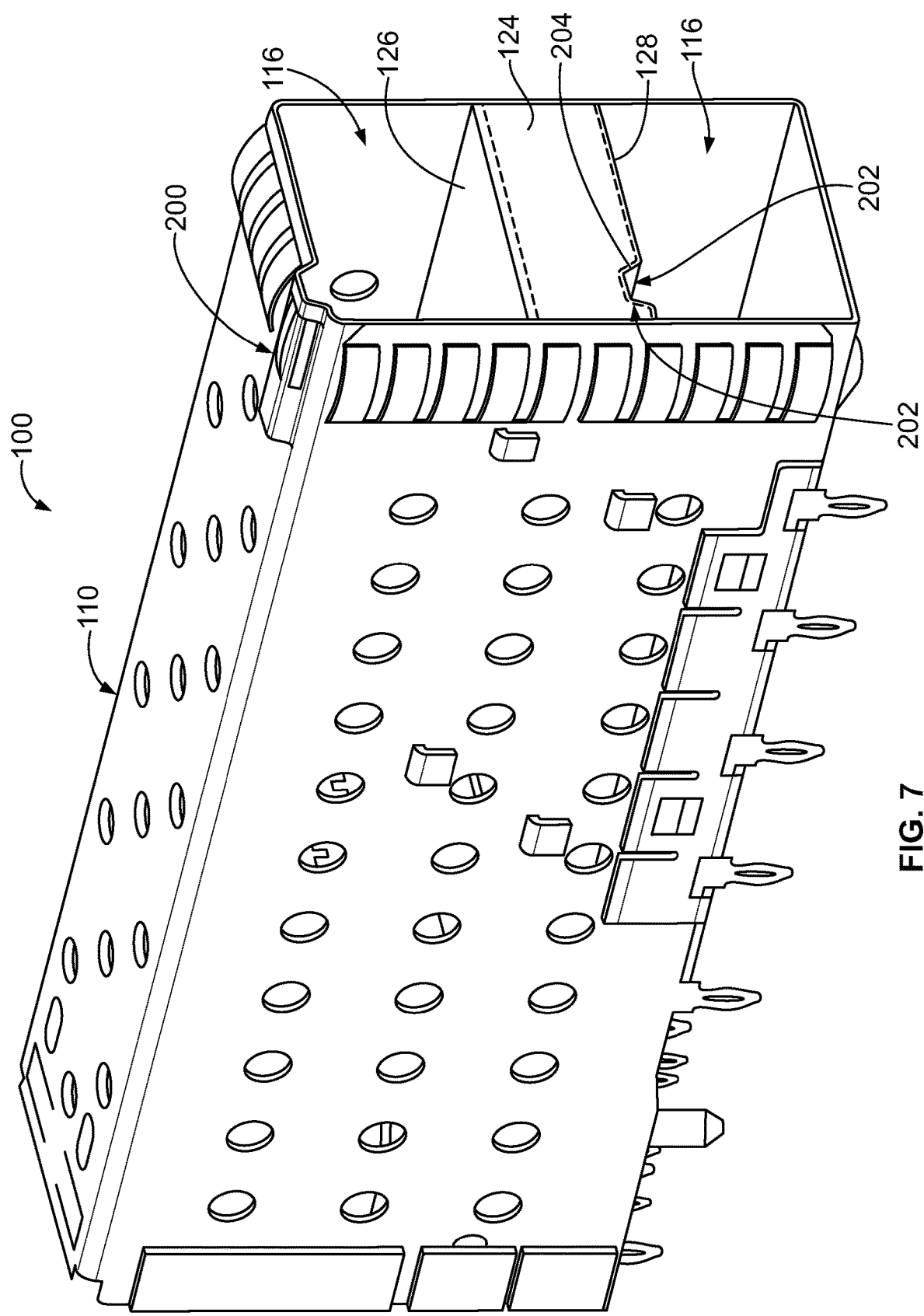
FIG. 7 is a perspective view of the communication system in accordance with an exemplary embodiment showing the receptacle cage having upper and lower module channels.

FIG. 7 is a perspective view of the communication system 100 in accordance with an exemplary embodiment showing the receptacle cage 110 having upper and lower module channels 116. The receptacle cage 110 includes a separator panel 124 between the upper and lower module channels 116. The separator panel 124 includes a first wall 126 and a second wall 128. The first wall 126 defines a bottom wall of the upper module channel 116 and the second wall 128 defines a top wall of the lower module channel 116. The second wall 128 includes a cage polarization feature 200 having a polarization feature channel 202 in the form of a shroud 204.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A receptacle connector assembly comprising:
   a receptacle cage configured to be mounted to a host circuit board, the receptacle cage having a top wall, a first side wall extending from the top wall and a second side wall extending from the top wall opposite the first side wall, the top wall, the first side wall and the second side wall forming a module channel configured to receive a pluggable module, the top wall being non-planar having a shroud extending therefrom forming a cage polarization feature, the shroud having a first shroud side wall, a second shroud side wall and a shroud top wall forming a trapezoidal shaped polarization feature channel configured to receive a polarization feature of the pluggable module; and
   a communication connector positioned relative to the module channel for interfacing with the pluggable module, the communication connector configured to be electrically connected to the host circuit board.

2. The receptacle connector assembly of claim 1, wherein the first shroud side wall is angled non-perpendicular to the shroud top wall and the second shroud side wall is angled non-perpendicular to the shroud top wall.

3. The receptacle connector assembly of claim 1, wherein the first shroud side wall is nonparallel to the second shroud side wall.

4. The receptacle connector assembly of claim 1, wherein the receptacle cage extends between a front end and a rear end, the top wall having a front edge at the front end, the front edge being continuous between the first side wall and the second side wall and extending along the shroud over the polarization feature channel.

5. The receptacle connector assembly of claim 1, further comprising a gasket coupled to the top wall, the gasket having a plurality of spring fingers deflectable relative to the top wall, the gasket being coupled to the shroud.

6. The receptacle connector assembly of claim 5, wherein the gasket includes a base having a complementary shape as the top wall, the base extending along the first shroud side wall, the second shroud side wall and the shroud top wall, the base extending between the shroud and the first side wall, and the base extending between the shroud and the second side wall.

7. The receptacle connector assembly of claim 5, wherein the gasket has at least one spring finger extending along the first shroud side wall.

8. The receptacle connector assembly of claim 7, wherein the spring finger along the first shroud side wall is deflectable in a first deflection direction non-orthogonal to a second deflection direction of the nearest spring finger along the top wall.

9. The receptacle connector assembly of claim 1, wherein the top wall includes a panel, the shroud extending upward from the panel.

10. The receptacle connector assembly of claim 9, wherein the panel of the top wall includes a first segment between the first shroud side wall and the first side wall and a second segment between the second shroud side wall and the second side wall, the first and second segments being coplanar.

11. The receptacle connector assembly of claim 10, wherein the top wall includes a first corner connecting the first segment and the first shroud side wall and a second corner connecting the second segment and the second shroud side wall, the top wall being continuous through the first corner and through the second corner.

12. The receptacle connector assembly of claim 10, further comprising a gasket coupled to the top wall, the gasket having a plurality of spring fingers deflectable relative to the top wall, the gasket having at least one spring finger extending along the first segment, the gasket having at least one spring finger extending along the first shroud side wall, the gasket having at least one spring finger extending along the second shroud side wall, and the gasket having at least one spring finger extending along the second segment.

13. The receptacle connector assembly of claim 1, wherein at least one of the first shroud side wall, the second shroud side wall and the shroud top wall is curved.

14. The receptacle connector assembly of claim 1, wherein the shroud is triangular shaped having the first shroud side wall meeting the second shroud side wall at the shroud top wall, the shroud top wall being a point.

15. A receptacle connector assembly comprising:
    a receptacle cage configured to be mounted to a host circuit board, the receptacle cage having a top wall, a first side wall extending from the top wall and a second side wall extending from the top wall opposite the first side wall, the top wall, the first side wall and the second side wall forming a module channel configured to receive a pluggable module, the top wall having a shroud extending therefrom forming a cage polarization feature, the shroud being trapezoidal shaped forming a trapezoidal shaped polarization feature channel configured to receive a polarization feature of the pluggable module, the receptacle cage comprising a gasket along the top wall, the gasket having a plurality of spring fingers deflectable relative to the top wall, the gasket extending along the shroud; and
    a communication connector positioned relative to the module channel for interfacing with the pluggable module, the communication connector configured to be electrically connected to the host circuit board.

16. The receptacle connector assembly of claim 15, wherein the shroud includes a shroud top wall extending between a first shroud side wall and a second shroud side wall, the first shroud side wall being nonparallel to the second shroud side wall.

17. The receptacle connector assembly of claim 16, wherein the gasket has at least one spring finger extending along the first shroud side wall and wherein the gasket has at least one spring finger extending along the second shroud side wall.

18. The receptacle connector assembly of claim 15, wherein the receptacle cage extends between a front end and a rear end, the top wall having a front edge at the front end, the front edge being continuous between the first side wall and the second side wall and extending along the shroud over the polarization feature channel.

19. A receptacle connector assembly comprising:
    a receptacle cage configured to be mounted to a host circuit board, the receptacle cage extending between a front end and a rear end, the receptacle cage having a top wall, a first side wall extending from the top wall and a second side wall extending from the top wall opposite the first side wall, the top wall, the first side wall and the second side wall forming a module channel having a port at the front end configured to receive a pluggable module, the top wall having a front edge at the front end of the receptacle cage, the front edge being continuous between the first side and the second side, the front edge being non-planar forming a cage polarization feature having a trapezoidal shaped polarization feature channel configured to receive a polarization feature of the pluggable module; and a communication connector positioned relative to the module channel for interfacing with the pluggable module, the communication connector configured to be electrically connected to the host circuit board.

20. The receptacle connector assembly of claim 19, wherein the cage polarization feature includes a shroud top wall extending between a first shroud side wall and a second shroud side wall, the first shroud side wall being nonparallel to the second shroud side wall.

\* \* \* \* \*